(12) United States Patent
Coakley et al.

(10) Patent No.: US 6,478,135 B1
(45) Date of Patent: Nov. 12, 2002

(54) MODULAR PALLETIZED WORK STATION FOR ASYNCHRONOUS CONVEYOR SYSTEMS

(75) Inventors: Roy C. Coakley, North Lake, IL (US); Lawrence W. Klauser, Libertyville, IL (US)

(73) Assignee: R. C. Machines, Inc., Elk Grove Village, IL (US)

( * ) Notice: Subject to any disclaimer, the term of this patent is extended or adjusted under 35 U.S.C. 154(b) by 43 days.

(21) Appl. No.: 09/636,238

(22) Filed: Aug. 10, 2000

(51) Int. Cl.[7] .............................................. B65G 47/24
(52) U.S. Cl. .................................................. 198/345.3
(58) Field of Search .......................... 198/345.1, 345.2, 198/345.3

(56) References Cited

U.S. PATENT DOCUMENTS

| | | |
|---|---|---|
| 4,019,175 A | 4/1977 | Nakao et al. |
| 4,103,516 A | 8/1978 | Marcin |
| 4,136,519 A | 1/1979 | Field et al. |
| 4,148,400 A * | 4/1979 | Cross ....................... 198/345.3 |
| 4,253,559 A * | 3/1981 | Myers et al. ............. 198/345.3 |
| 4,265,131 A | 5/1981 | Grover |
| 4,428,300 A * | 1/1984 | Ziegenfus et al. ... 198/345.3 X |
| 4,556,141 A | 12/1985 | Faitel |
| 4,570,782 A | 2/1986 | Cargill et al. |
| 4,573,862 A | 3/1986 | Anderson |
| 4,629,384 A | 12/1986 | Beshke et al. |
| 4,639,963 A | 2/1987 | Fisher |
| 4,736,830 A * | 4/1988 | Hofmann .................. 198/345.3 |
| 4,750,605 A | 6/1988 | Brems |
| RE32,804 E | 12/1988 | Mason |
| 4,865,180 A | 9/1989 | Brems et al. |
| 5,078,254 A | 1/1992 | Colonius et al. |
| 5,115,546 A | 5/1992 | Mitsukuchi et al. |
| 5,168,976 A | 12/1992 | Kettelson |
| 5,211,278 A | 5/1993 | Mendenhall |
| 5,282,524 A * | 2/1994 | Kakida et al. ....... 198/345.3 X |
| 5,318,167 A | 6/1994 | Bronson et al. |
| 5,412,759 A | 5/1995 | Yano et al. |
| 5,485,911 A | 1/1996 | Kettelson et al. |
| 5,645,382 A | 7/1997 | Homanick et al. |
| 5,781,004 A | 7/1998 | Gaete |
| 5,799,912 A | 9/1998 | Ponzio |
| 5,860,505 A | 1/1999 | Metzger |
| 5,871,083 A | 2/1999 | Yamaguchi |
| 5,882,174 A | 3/1999 | Woerner et al. |
| 6,213,285 B1 * | 4/2001 | Smith .................. 198/345.3 X |

FOREIGN PATENT DOCUMENTS

DE  3618584  * 12/1987  ............... 198/345.3

OTHER PUBLICATIONS

1.) *Cargill Detroit Automatic Register*, Description of Operation and disadvantages, attached drawings.
2.) *Creative Solutions for Manufacturing—Challenge*, Taken from Cargill Detroit Corporation, 4 pgs.
3.) *Combined Nonsynchronous Machining with CNC Technology for Dramatic Gains in Productivity*, taken from Detroit Corporation, 6 pgs.

* cited by examiner

*Primary Examiner*—James R. Bidwell
(74) *Attorney, Agent, or Firm*—Niro, Scavone, Haller & Niro (57) ABSTRACT

An asynchronous system for conveying a pallet between one or more work stations and facilitating work operations upon a fixture located on the pallet. Each work station may include one or more fixed location blocks located adjacent to a conveyor. Each location block may have locating bushings and locating pads. The pallet has engagement pins and tooling pads. A lifting and locking mechanism is provided for removing the pallet from the conveyor and for locking the pallet into a rigid position such that the pallet is brought into registration, along X, Y and Z dimensions, with the one or more location blocks through connection of the engagement pins and bushings, and connection of the locating and tooling pads. Pressurized air and shielding mechanisms may be used to remove foreign particulate which may interfere with registration of the pallet and the location blocks.

18 Claims, 10 Drawing Sheets

MODULAR PALLETIZED WORK STATION FOR ASYNCHRONOUS CONVEYOR SYSTEMS

BACKGROUND OF THE INVENTION

The present invention relates to palletized modular work stations used with asynchronous conveyor systems.

Palletized conveyors transporting pallets between work stations along "transfer lines", with each pallet holding work pieces in a precise location using fixtures rigidly mounted to the pallets, have been available for many years. The pallets are conveyed along a conveyor line, lifted off of the moving conveyor, rigidly clamped for a work operation, and then released and returned to the moving conveyor to allow subsequent work operations to be performed down-line. Removal of the pallet off of the conveyor provides two advantages: it allows the conveyor to continue moving without having to stop for a work operation, and it also isolates the pallet from conveyor vibrations during work operations. Examples of such systems are disclosed in U.S. Pat. No. 4,570,782 to Cargill; U.S. Pat. No. 4,629,384 to Beshke; U.S. Pat. No. 4,639,963 to Fisher; and U.S. Pat. No. 5,860,505 to Metzger.

There are disadvantages associated with known palletizing conveyor systems. For example, some systems require the use of customized pallets having ground surfaces to facilitate pallet clamping and registration after the pallet has been removed from the conveyor chain or drive media. These systems are expensive, and consist of heavy-duty castings designed to support pallets as heavy as one ton or more. Replacing tooling on such systems is similarly expensive. The wedge-lock principle of registration they employ also requires the engagement of a significant pallet surface area, which can result in mis-registration due to the trapping of foreign particulate on the surface contact areas.

Accordingly, it is an object of the present invention to provide an asynchronous palletized conveyor system which is a lighter-duty version than known heavy-duty systems, and which is manufactured in a substantially more economical manner.

Another object of the invention is to provide such a system which is "modular" in the sense that it provides a fixture-carrying device that is standardized and may be used with a variety of work pieces, to perform a variety of work functions on the work pieces, using relatively inexpensive tooling and pallets/pallet carriers.

Still another object is to provide such a system which employs locating mechanisms that rigidify the pallet in precise location within three (X, Y and Z) dimensions, and which do not require changing fixture designs commonly in use for accurately locating a workpiece on a pallet in three dimensions.

A further object is to provide a reliable mechanical clamping lock for the pallet when the pallet has been disengaged from the conveyor chain or drive media and has been brought into a registration position.

Yet another object is to provide such a system which provides a shielding mechanism against trapped foreign particulate which may interfere with the pallet locating mechanism and cause mis-registration of the pallet.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Asynchronous" palletized conveyor system means a system in which operations are performed at varying times on different palletized work pieces at work stations located along a particular conveyor, so that each pallet may be lifted from a conveyor chain or drive media and returned to a moving conveyor without the need to halt the conveyor.

"Conveyor" means any mechanism or means for transporting pallets between work stations, whether in a closed circuit or open circuit fashion, and whether using belts, chains, power rollers or other mechanisms or means.

"Foreign particulate" means foreign particles, such as metal shavings, either generated by work operations performed on the fixture or deposited by other means.

"Registration" or "establishes registration" means that a pallet is brought into engagement with one or more location blocks, so that the pallet is fixed in position and accurately located with respect to three (X, Y, Z) dimensions.

"Registration engagement mechanisms" mean devices used to locate and connect the pallet to the location block of the work station, such as but not limited to the engagement pins and tooling pads.

"Three dimensions" or "X, Y and Z dimensions" means the two horizontal dimensions, length and width (X, Y) and the vertical dimension, height (Z).

SUMMARY OF THE INVENTION

The objects mentioned above, as well as other objects, are solved by the present invention, which overcomes disadvantages of prior art asynchronous palletized conveyor systems and mechanism, while providing new advantages not believed associated with such systems and mechanisms.

The present invention is directed to an asynchronous system for conveying a pallet between one or more work stations and facilitating work operations upon a fixture located on the pallet. In another embodiment, the invention consists of the work station itself. Both the system and the work station are now described.

A preferred embodiment of a system according to the present invention includes a conveyor for continuously moving the pallet between the one or more work stations located along the conveyor system. Each of the one or more work stations includes opposed location blocks located adjacent to the conveyor. The location blocks are provided with a first set of registration engagement mechanisms. The pallet is provided with a second set of registration engagement mechanisms. A lifting and locking mechanism is employed to remove the pallet from the conveyor chain or drive media and for locking the pallet into a rigid registration position at which the pallet is brought into accurate registration, along X, Y and Z dimensions, with the opposed location blocks through connection of the first and second sets of registration engagement mechanisms.

In a particularly preferred embodiment, the first set of registration engagement mechanisms includes a plurality of locating bushings and locating pads, while the second set of registration engagement mechanisms includes a plurality of engagement pins and tooling pads. Connection of the locating bushings and engagement pins establishes registration of the pallet with respect to the opposed location blocks along the X and Y dimensions, while connection of the locating pads and tooling pads establishes registration of the pallet with respect to the opposed location blocks along the Z dimension.

In a preferred embodiment, the lifting and locking mechanism includes a pressurized cylinder, which may be a pneumatic cylinder, driving two pairs of pivotally attached links. Each of the links may be pivotally connected to a link arm terminating in a wedge. Vertical movement of the cylinder may cause link arms to exert a lateral force on the wedges, which in turn may exert a lifting force on the pallet sufficient to lift the pallet off of the conveyor and lock the pallet into a fixed position above the conveyor and into the engaged registration position. Angled surfaces on the sides of the pallet mirroring angled surfaces on the wedges may be provided to facilitate engagement of the wedges with the pallet, and to transmit lateral wedge movement into vertical pallet movement. In a particularly preferred embodiment, the angled engaging surfaces on the wedges form an angle of about 20° with a horizontal plane. Preferably, the pallet has opposed, substantially planar side surfaces.

In another preferred embodiment, and to provide additional flexibility to the use of the present invention, a pallet carrier may be used to mount the pallet, and may be carried by the conveyor.

In another preferred embodiment, the locating pads in the location blocks are in fluid communication with air passages supplied with pressurized air, so that foreign particulates may be removed from the pad area prior to pallet registration with the fixed location blocks. One or more pressure switches may also be provided to monitor the flow of pressurized air within the air passages. In one preferred embodiment, if a predetermined minimum air flow is detected after registration of the pallet with the opposed location blocks, an alarm is provided to alert the user to the fact that mis-registration may have occurred, perhaps due to the presence of foreign particles such as metal shavings in a registration area. Alternatively, the locating bushings may be provided with air passages supplied with the pressurized air, for the same purpose. In yet another alternative embodiment, other mechanisms, such as wipers, may be provided for shielding, obstructing or removing foreign particulate from registration areas such as areas in or adjacent to the engagement pins or tooling pads.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings, in which:

DESCRIPTION OF THE PREFERRED EMBODIMENT AND BEST MODE

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
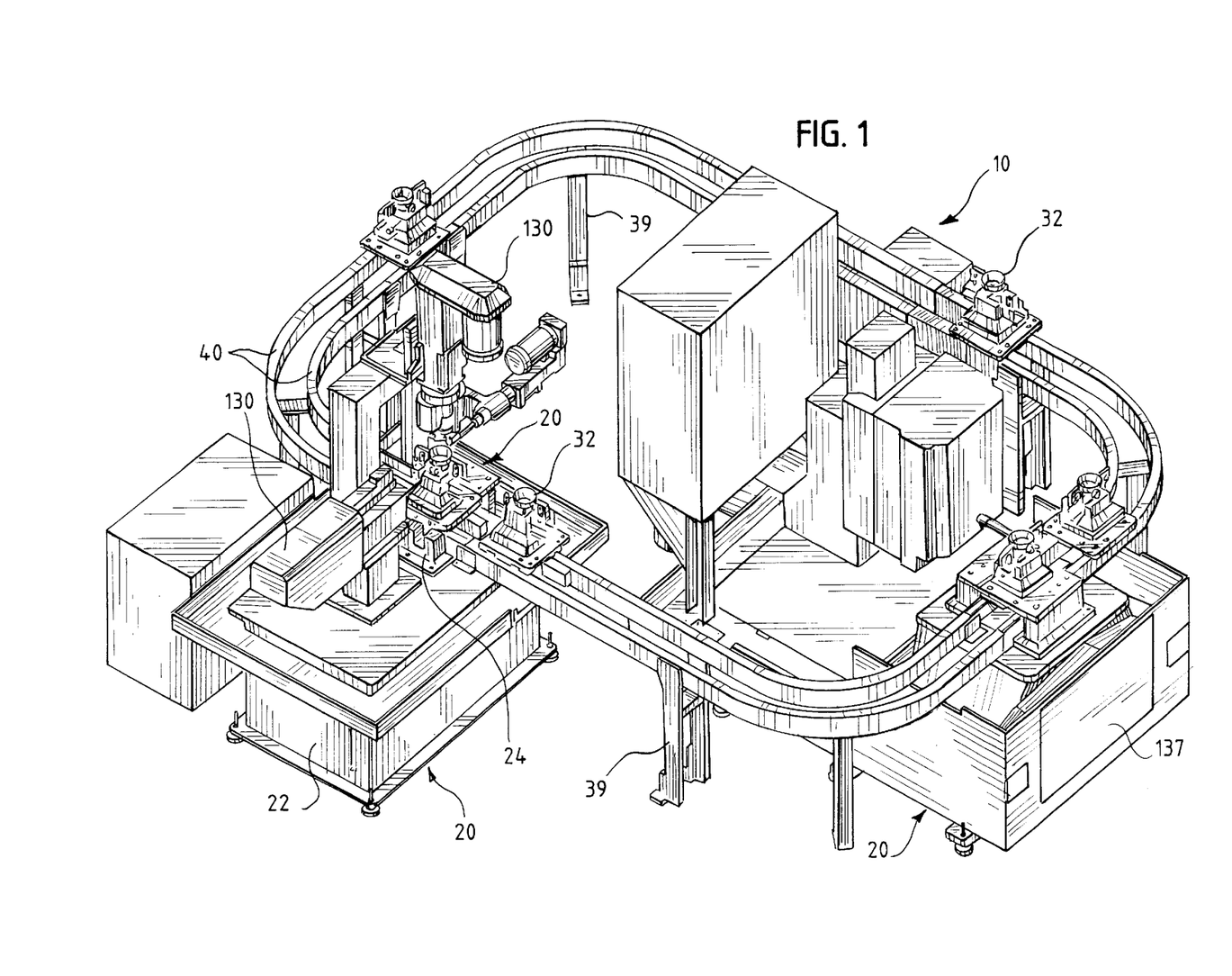
FIG. 1 is a planar and side perspective view of a preferred embodiment of modular palletized work stations used in connection with an asynchronous conveyor system, according to the present invention.

Referring to FIG. 1, a preferred embodiment of the asynchronous palletized conveyor system of the present invention is shown, employing a rectangular closed circuit conveyor system 10 with two work stations 20. Of course, open circuit conveyor systems or conveyor circuits of various geometries, such as circular or straight, may be used in connection with the present invention. Each work station may consist of a cabinet or housing 22 mounting the pallet lock-up and registration mechanism, generally referred to as 30, which includes base plate casting 24. In a preferred embodiment, the Modu Con 2C conveyor from AMC of Auburn Hills, Mich. may be used. This conveyors, and other known conveyors systems like it, cause pallet travel through frictional engagement with the pallet. A pre-stop, shown as item 88 in FIGS. 2–3, such as an air cylinder and lever that engages the pallet, is preferably provided, such as the one available from AMC, MC2 Pallet Stop with cushion, Part No. M0202800/H. A conveyor segment may mount this pre-stop, and may be attached to conveyor guides 40a, 40b at each work station 20. To facilitate the engagement of these segments to conveyor 40, brackets 137 may be used. Of course, as further explained below, in alternative embodiments of the present invention, a pallet carrier and a pre-stop need not be used; rather, only a suitably-shaped pallet need be used.

Figure 2:
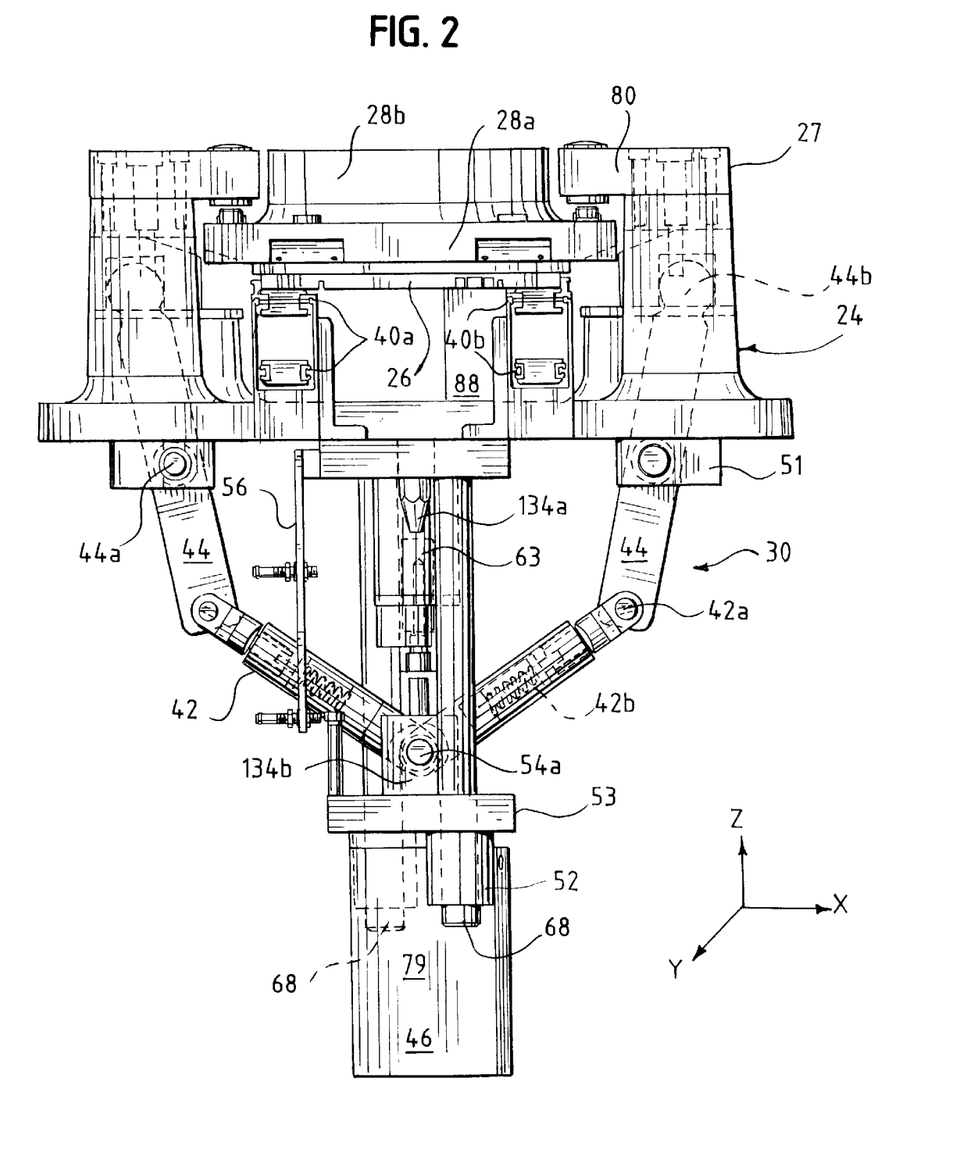
FIG. 2 are side views of a preferred pallet engagement and registration mechanism according to the invention, showing the mechanism in unclamped (FIG. 2) and clamped/locking (FIG. 3) positions.

Referring to FIGS. 2–11, pallet lifting, locking and registration mechanism 30 is shown in more detail. Referring to FIGS. 1–2, base plate casting 24 may be mounted to housing/cabinet 22 or to opposed pedestals 25. Dual chain drive conveyor chain or drive media 40 may be separately mounted on the floor by support brackets 39, as shown in FIG. 1. Each track of conveyor 40 passes within conveyor guides 40a, 40b of mechanism 30, as shown in FIG. 2. Alternatively, a single conveyor rail may be used, but this is less preferred for stability reasons.

During pallet conveyance, pallet carrier 26, shown in FIG. 2, is carried by conveyor chain or drive media 40, which are mounted on conveyor guides 40a, 40b at each work station 20. In the preferred embodiment, a pallet carrier 26 is used to mount pallet 28; use of such a pallet carrier provides more flexibility to the unit, since it may be used with the pre-stop described above, or may also be used, for example, with a "lift and turn" mechanism. However, in other embodiments according to the invention, pallet carrier 26 need not be used, and pallet 28 may be configured accordingly. The preferred embodiment of pallet 28 includes a horizontal section 28a with wedge-engaging pockets $28a_1$ and a sloped riser section 28b. The upper portion of riser 28b is rigidly connected to fixture plate 31, in a manner well known in the art. Fixture plate 31 rigidly locates and carries fixture or work piece 32, upon which work operations will be performed, again as is well known in the art.

A description of the components of a preferred embodiment of pallet off-loading, locking and registration mechanism 30, which may be provided at each work station 20, is now provided, followed by a description of operation.

Referring again to FIGS. 2–11, and especially FIGS. 2–3 and 11, the preferred embodiment and current best mode of mechanism 30 includes two pairs of link rods or spring barrels 42, and two linked pairs of levers or link arms 44. Each link rod 42 includes a die spring 42b which imparts the link with the ability to compress while traveling slightly over-center to the locking position shown in FIG. 3. Each link rod 42 also has a yoke end 43 through which passes a clevis pin 44a, pivotally attaching link rod 42 to link arm 44. Each pair of link rods 42 is pivotally attached by a hardened clevis pin 54a to a lower pivot block 54. Each lower pivot block 54 is rigidly mounted on guide plate 53. Guide rods 68 do not move and are rigidly attached to (pressed into) die set base 57. Guide bearing 52 and guide plate 53 ride up and down on guide rod 68. Guide bearings 52 may consist of linear friction bearings, such as oil-impregnated bronze bushings. Guide rods 68 and guide bearing 52 help maintain guide plate 53 in proper alignment as it is moved up and down by main cylinder 46.

Each link arm 44 is pivotally attached at an intermediate location of the arm to upper clevis bracket 51 at clevis pin 44a. Each upper clevis bracket 51 is rigidly attached to a lower portion of base plate casting 24. The upper portion of each link arm 44 terminates in a ball section 44b which wipes or cams within wedge block 48. Opposed wedge blocks 48 include angled surfaces 48a which are moved laterally inward as they are contacted by ball sections 44b of rotating link arms 44, as further discussed below.

Figure 7:
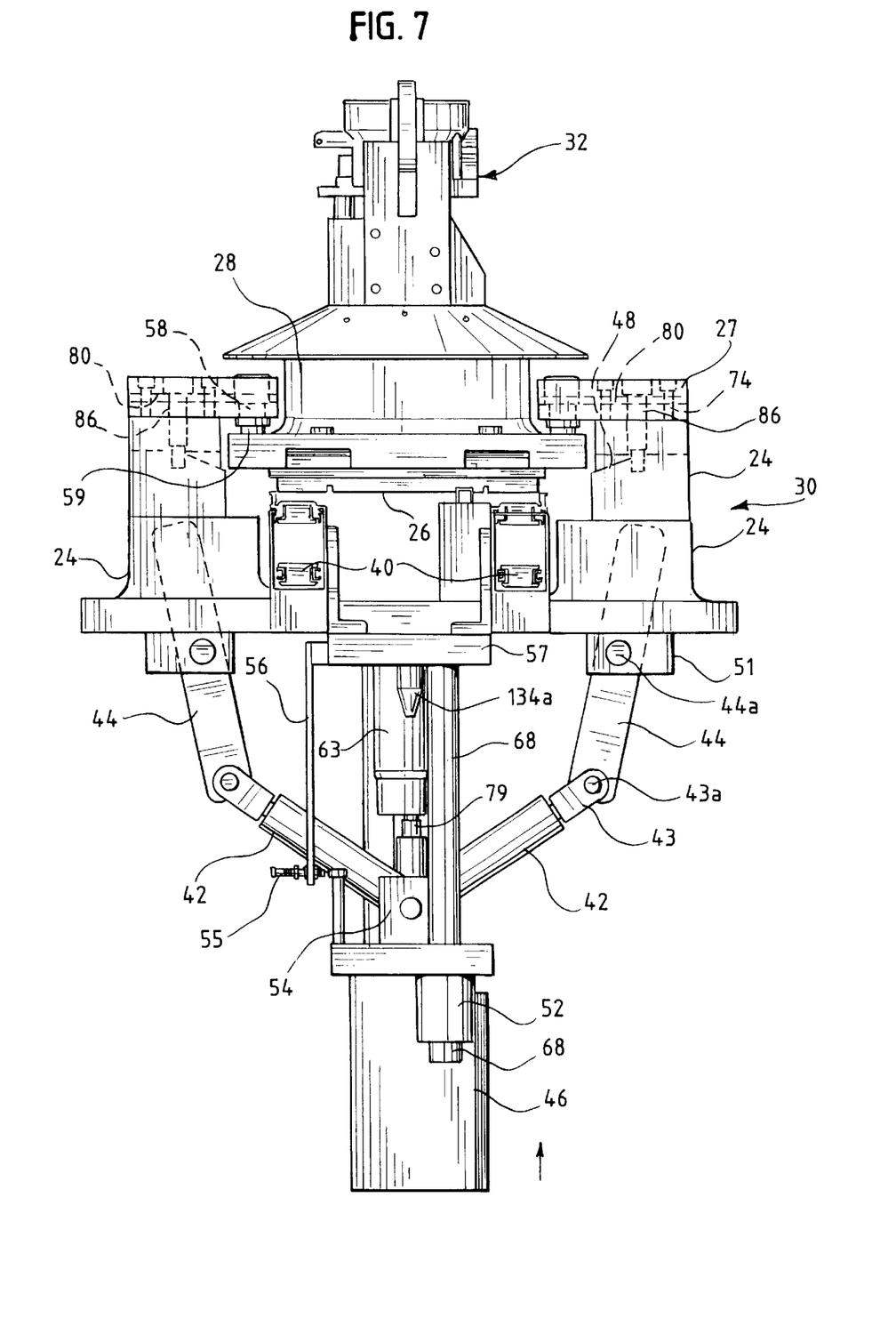
FIG. 7 is a side perspective view with transparent tooling blocks to facilitate viewing portions of the pallet off-loading, locking and registering mechanism.
Figure 8:
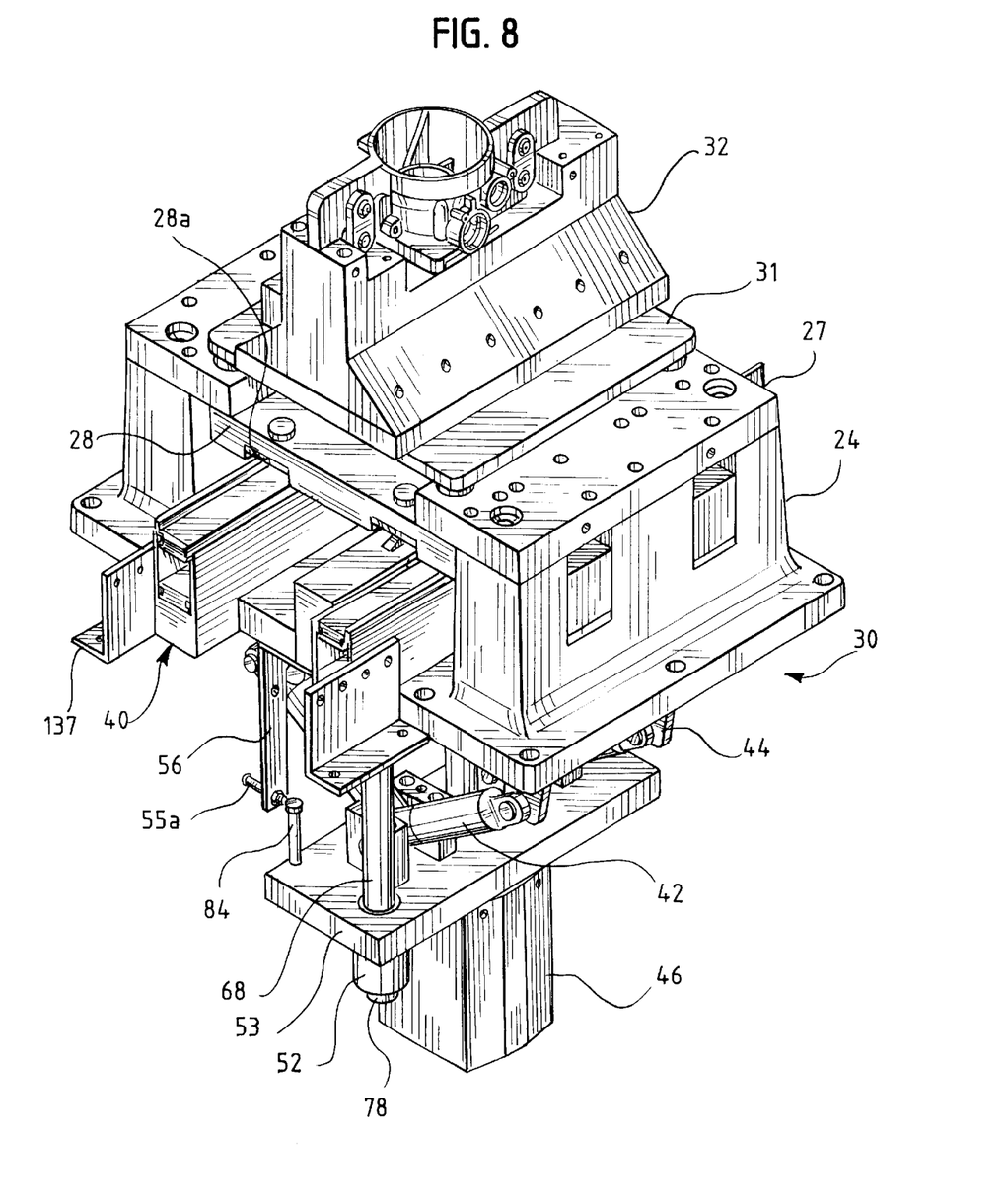
FIG. 8 is a side and front planar perspective view of a fixture work station according to the present invention.
Figure 9:
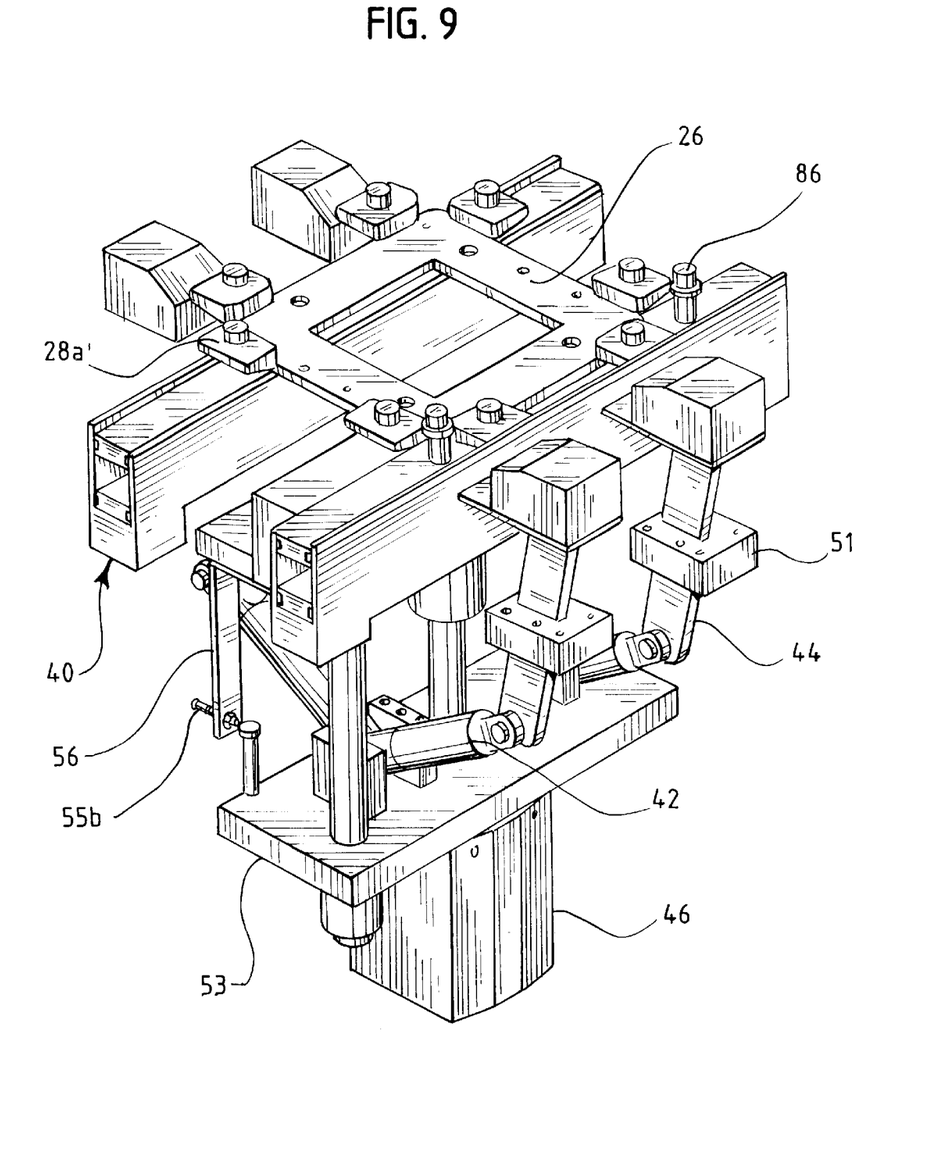
FIG. 9 is a view similar to FIG. 8 but with the tooling block, pallet and fixture removed, exposing the pallet carrier.
Figure 10:
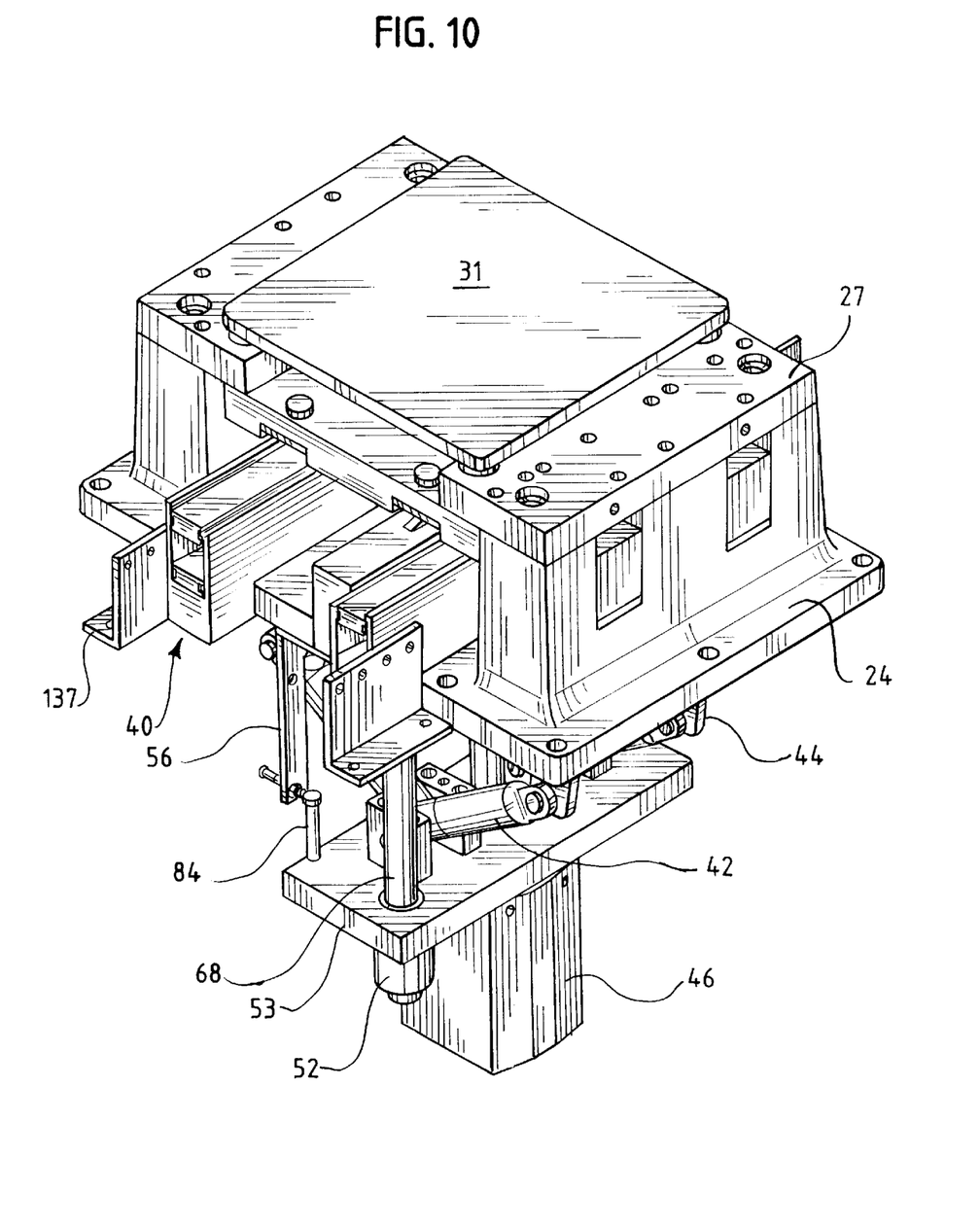
FIG. 10 is a view similar to FIG. 8 without a fixture.

Cylinder rod 79 attaches to main pneumatic cylinder 46 (which may be either pneumatically or hydraulically controlled) and is, in turn, coupled to cylinder rod spacer 63 by cylinder coupler 63a. Cylinder coupler adaptor 63b is bolted or otherwise attached to spacer 63 and facilitates this coupling attachment. Main cylinder 46 drives movement of guide plate 53 and lower pivot blocks 54, as further explained below. Four fundo positioning pins 86, high precision dowel pins available from Schunk of Germany, are preferably provided to facilitate precise assembly of clamp plate or location block 27 and base plate casting 24, together referred to as the tooling block. Location block 27 and casting 24 are connected by bolts 74 (FIG. 7).

In operation, pallets 28 are lifted off of conveyor chain or drive media 40 and into a registration position as follows. Referring to the sequential operation shown in FIGS. 2 and 3, main actuating cylinder 46 is first caused to move vertically upward. This causes a "die set" consisting of the following components to move vertically upward: lower pivot blocks 54; guide plate 53; cylinder rod spacer 63; and linear friction bearings 52. Upper and lower vertical travel stops 134a, 134b contact each other to limit and cushion vertical movement of the die set at its travel end locations.

Figure 3:
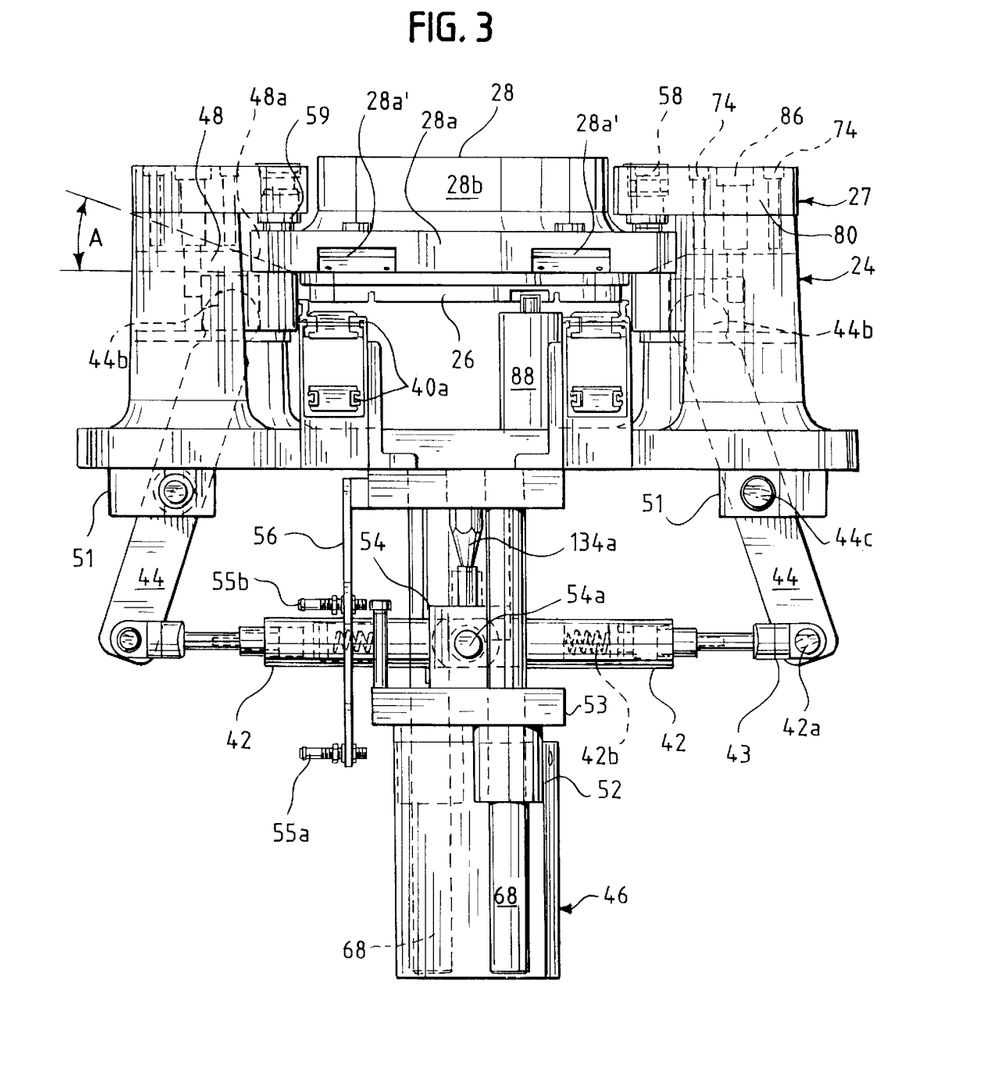
Figure 4:
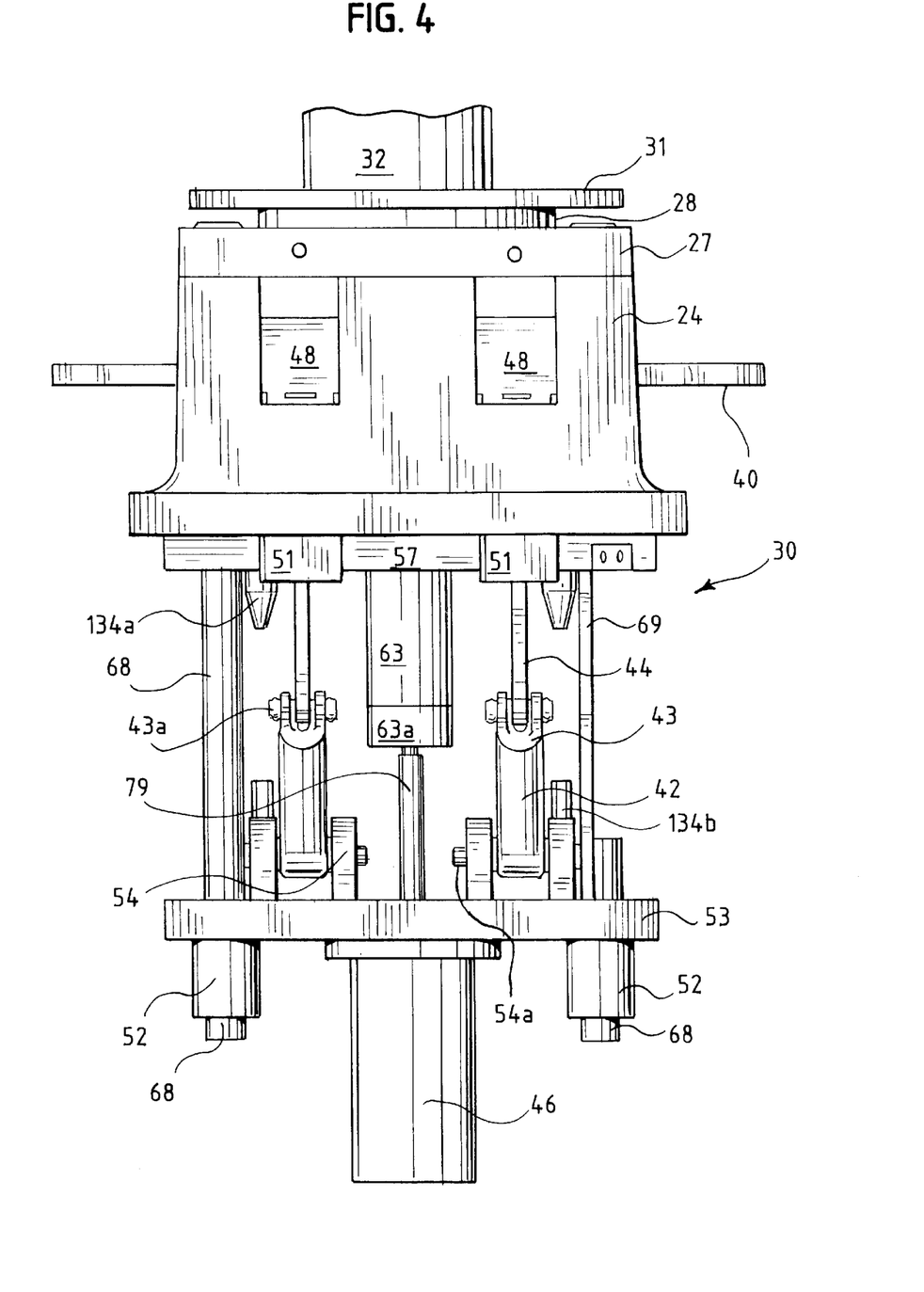
FIG. 4 is a front view of the mechanism shown in FIG. 2 with the cylinder rod shown in its fully extended position.
Figure 5:
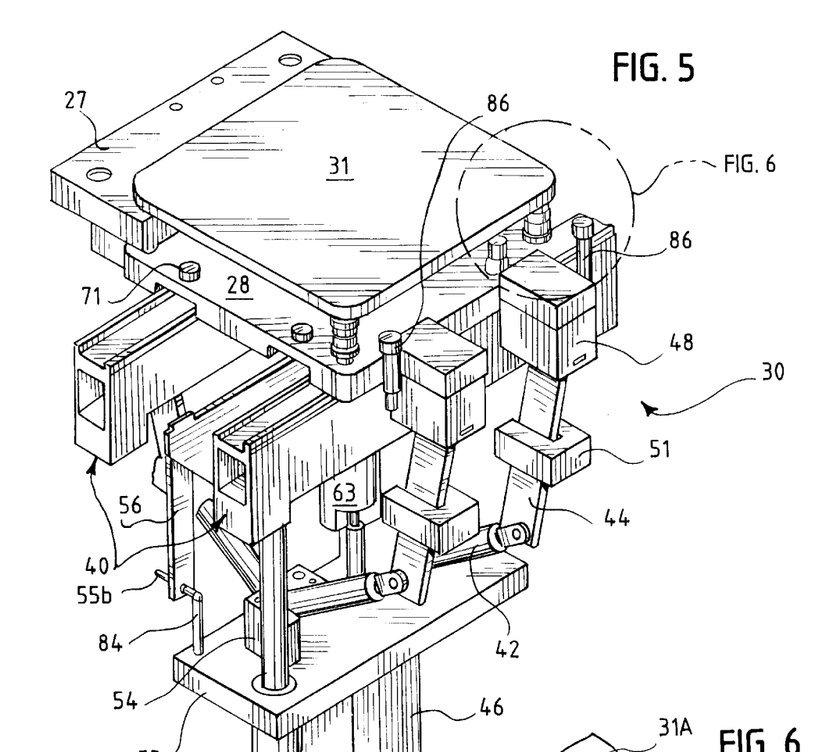
FIG. 5 is a planar and side perspective view of the mechanism shown in FIGS. 2–4, with the opposed base plate castings and the right-side location block removed.

The upward movement of the die set causes link rods 42 to rotate from their position shown in FIG. 2 into a substantially horizontal but over-center position, as shown in FIG. 3. This causes link arms 44 to rotate about their pivot 44a, as shown, exerting a lateral force on wedges 48. Pallet 28 includes hardened steel wedge engaging pockets $28a_1$ which have angled surfaces shaped to match and engage with like-angled wedge surfaces 48a. As right link arm 44 rotates counter-clockwise, for example, ball section 44a exerts a lateral force on wedge box 48, causing angled wedge surface 48a to be inserted within pocket $28a_1$. The lateral movement of wedges 48 and the sliding, frictional contact of wedge surfaces 48a and pallet pockets $28a_1$ drive pallet 28 vertically upward off of conveyor chain or drive media 40 (perhaps about ⅛-inch off of the chain, for example), until wedge surfaces 48a are firmly engaged and locked within pockets $28a_1$.

Figure 6:
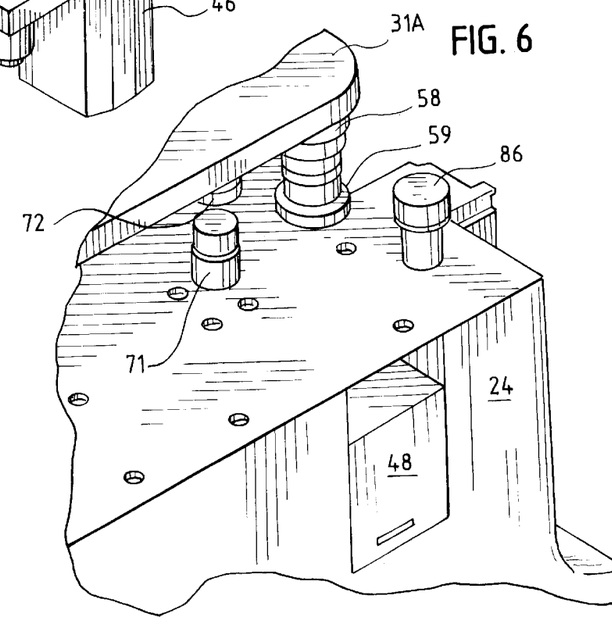
FIG. 6 is an enlarged view of the circled upper corner of the mechanism of FIG. 5, together with a base plate casting.

At this same time, pallet registration is accomplished. Thus, pallet tooling pads 71 and clamp plate locating pads 72 meet and engage, establishing the Z-axis location for the pallet. Also at this time, clamp plate locating bushings 58 on the lower overhanging surface of clamp plate 27, and pallet engagement pins 59, meet and engage, establishing the X-axis and Y-axis locations for the pallet, as best shown in FIG. 6. Non-locating pin 73 plugs its opening so metal shavings, for example, do not enter the opening.

Preferably, pallet 28 may be engaged and lifted off of conveyor chain or drive media 40 from any direction. For this purpose, pallet pockets $28a_1$, tooling pads 71 and engagement pins 59 are located on all four sides of pallet 28. Two pairs of engaging pins 59 are loose fitting, to facilitate guiding engagement. The other two pairs of pins 59 are always located at opposite corners; of these, one pair is a diamond-shaped pin which engages a bushing 58 with a round hole, while the other is a round pin 59 which also engages a round bushing 58. The diamond shape decreases the surface area of the pin, and facilitates engagement and disengagement. The round pin oppositely positioned from the diamond-shaped pin is a very accurate size pin, responsible for position repeatability.

The wedges are now locked in place by the locking system consisting of cylinder 46, guide plate 53, lower pivot blocks 54, link rods 42, link arms 44 and wedges 48. In a preferred embodiment, pneumatic, compressed air-driven cylinder 46 has a 90 mm. bore, has compressed air at about 80 psi, and provides about 790 pounds of lifting force. The use of an air cylinder is preferred since it provides a substantial cost savings over larger pallet locking systems requiring the use of a hydraulic cylinder(s). Referring to FIG. 3, upper vertical movement of cylinder 46 places link arms 44 in an over-center position so that arms 44 are mechanically locked in place. This mechanical lock has been tested to withstand forces of up to 5,000 pounds.

The shape of wedges 48 is important. Thus, wedges 48 should be provided with an engaging angle "A" sized to transmit lateral movement of wedges 48a into a vertically directed force sufficient to lift pallet 28, while maintaining firm locking engagement within pallet pocket angled surfaces $28a_1$ and overcoming any resistance created by work operations performed on the fixture part such as machining. In the preferred embodiment, angle A is about 20 degrees. In the preferred embodiment of the invention shown in the drawings, when the mechanism is in a locked position, the wedges have been tested to withstand 5,000 pounds of force applied to break the pallet from the grip of the wedges.

Figure 11:
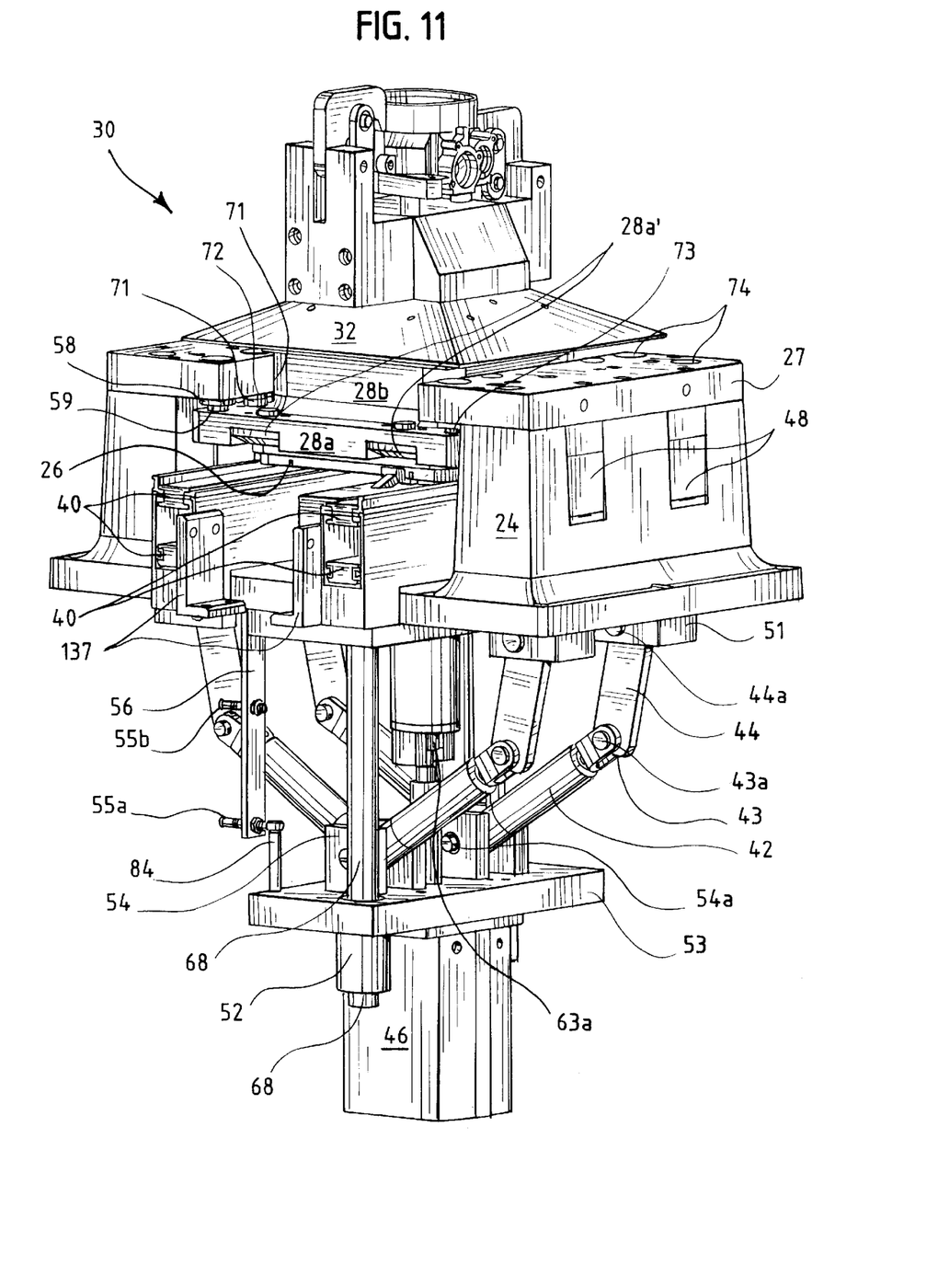
FIG. 11 is a schematic view of a preferred pallet off-loading, locking and registration mechanism according to the previous drawings.

Sensors may be provided to monitor the movement of guide plate 53 and link rods 42. Referring to FIG. 11, prox switches 55a, 55b are shown mounted on sensor mount 56.

Bolt 84 provides an indication to the prox switches that guide plate 53 is in either the lower or upper (locked) positions. If mechanism 30 is not provided in proper retracted or locking positions at the appropriate times, a suitable alarm, such as lights and/or an audible alarm, may be provided to alert the user to this error condition.

Air passages 80 may be provided in pads 71, 72, as shown in FIG. 7, leading to a source of compressed air (not shown). The compressed air passes out through the air passages in pads 71, 72 to remove any foreign particulate that may be present on these surfaces, and might otherwise cause pallet mis-registration along the Z-axis. In a preferred embodiment, air flow is monitored at the four pad locations 71, 72 by pressure switches (not shown) which indicate whether or not a predetermined air pressure (e.g., about 10–15 psi) has been reached within a predetermined time (e.g., about 0.5–0.7 seconds). If air flow is detected when the pallet is in the locked position, an alarm, which may be audible or visual, may be activated and no further processing may be permitted to take place until manual intervention corrects the problem. For this same purpose, air passages and pressurized air may also be provided through locating bushings 58.

Other mechanisms may be used to shield or facilitate removal of foreign particles, such as metal shavings, for example, from the registration area, i.e., the contact surface areas between the pallet and the location blocks, or from registration engagement areas such as the engagement pins and tooling pads. For example, mechanical wipers may be used for this purpose, and located adjacent the engagement pins and locating bushings, and/or adjacent the locating and tooling pads.

It is believed that the pallets and/or pallet carriers and lifting and registration mechanisms described above may be built in a more economical manner, using more traditional and less complicated grinding procedures. Rather than performing expensive grinding operations to obtain a pallet with an accurately machined angled side surface which is required for Y- and X-axis registration, as with some prior art systems, known jig grinding operations may be performed, for example, in what is believed to be a more economical manner, to provide a pallet with substantially planar side surfaces.

Using the palletized conveyor system of the present invention, various operations may be performed on work pieces, including material handling, modular assembly, machining, inspection, washing, water deburring and testing, for example. Both manual and automatic stations may be provided along the conveyor system. As non-limiting examples, turn-around stations, programmable horizontal and vertical CNC milling machines 137, and horizontal and vertical drilling heads 130 (FIG. 1) may also be used in conjunction with the present invention. Persons of ordinary skill in the art will understand that various additional features may also be provided in connection with the present invention, as desired, such as but not limited to automatic pallet flagging systems, offline shuttle locations, visual and audible alarms, etc.

The present invention finds particularly advantageous use in the smaller-scale palletized conveyor market, e.g., parts to be worked on that will fit within a 14 in$^3$ cube though, of course, the work stations and conveyor systems may be designed for larger-scale applications, as well.

The above description is not intended to limit the meaning of the words used in the following claims that define the invention. For example, it will be understood that systems and mechanisms not specifically mentioned here that accomplish the same general operations may do so in insubstantially different ways, while still operating within the principles of the present invention. Rather, it is contemplated that future modifications in structure, function or result will exist that are not substantial changes and that all such insubstantial changes are intended to be covered by the claims.

We claim:

1. An asynchronous system for conveying a pallet between one or more work stations and facilitating work operations upon a fixture located on the pallet, comprising:
    a conveyor for continuously moving the pallet between the one or more work stations located along the conveyor system;
    the one or more work stations comprising:
        opposed location blocks located adjacent to the conveyor, the location blocks housing a first set of registration engagement mechanisms;
        the pallet housing a second set of registration engagement mechanisms; and
        a lifting and locking mechanism comprising a pressurized cylinder driving one or more pivotally attached links for removing the pallet from the conveyor and for locking the pallet into a rigid registration position at which the pallet is brought into accurate registration, along X, Y and Z dimensions, with the opposed location blocks through engagement of the first and second sets of registration engagement mechanisms;
    wherein each of the one or more links is pivotally connected to one or more link arms terminating in a wedge, and wherein vertical movement of the cylinder causes the one or more wedges to exert a lifting and locking force on the pallet sufficient to lift the pallet off of the conveyor and lock the pallet into a fixed position above the conveyor and in engagement with the first set of registration engagement mechanisms of the opposed location blocks.

2. The palletized conveyor system of claim 1, wherein the first set of registration engagement mechanisms comprise a plurality of locating bushings and locating pads.

3. The palletized conveyor system of claim 2, wherein the second set of registration engagement mechanisms comprise a plurality of engagement pins and tooling pads.

4. The palletized conveyor system of claim 3, wherein engagement of the locating bushings and engagement pins establishes registration of the pallet with respect to the opposed location blocks along the X and Y dimensions.

5. The palletized conveyor system of claim 3, wherein engagement of the locating pads and tooling pads establishes registration of the pallet with respect to the opposed location blocks along the Z dimension.

6. The palletized conveyor system of claim 1, wherein the lifting and locking mechanism comprises a pressurized cylinder driving one or more pivotally attached links.

7. The palletized conveyor system of claim 6, wherein the pressurized cylinder comprises a pneumatic cylinder.

8. The palletized conveyor system of claim 1, further comprising a pallet carrier mounting the pallet and in frictional engagement with the conveyor during pallet conveyance.

9. The palletized conveyor system of claim 1, wherein each of the one or more wedges has angled engaging surfaces.

10. The palletized conveyor system of claim 9, wherein each of the angled engaging surfaces of the one or more wedges forms an angle of about 20° with a horizontal plane.

11. The palletized conveyor system of claim 10, wherein the pallet includes one or more angled engaging surfaces for engaging the angled engaging surfaces of the one or more wedges.

12. The palletized conveyor system of claim 1, wherein one or more of first and second set of registration engagement mechanisms is in fluid communication with one or more air passages supplied with pressurized air.

13. The palletized conveyor system of claim 12, further comprising one or more pressure switches for monitoring the flow of pressurized air within the air passages.

14. The palletized conveyor system of claim 12, further comprising means for monitoring air flow through one or more of the air passages and, if a predetermined minimum air flow is detected after registration of the pallet with the opposed location blocks, for providing an alarm to a user.

15. The palletized conveyor system of claim 1, wherein the first and second set of registration engagement mechanisms have registration engagement surfaces, and further comprising means for obstructing or removing foreign particulate from the registration engagement surfaces utilizing pressured air.

16. The palletized conveyor system of claim 1, wherein the pallet has opposed, substantially planar side surfaces.

17. The palletized conveyor system of claim 15, wherein the obstructing or removing means comprises mechanical wipers.

18. A work station located along an asynchronous system for conveying a pallet and facilitating work operations upon a fixture located on the pallet, comprising:

one or more fixed location blocks located adjacent to a conveyor, the location blocks having a plurality of locating bushings and a plurality of locating pads;

the pallet having a plurality of engagement pins and a plurality of tooling pads; and a lifting and locking mechanism comprising a pressurized cylinder driving one or more pivotally attached links for removing the pallet from the conveyor and for locking the pallet into a rigid position such that the pallet is brought into registration, along X, Y and Z dimensions, with the one or more location blocks through connection of the engagement pins and bushings, and connection of the locating and tooling pads;

wherein each of the one or more links is pivotally connected to one or more link arms terminating in a wedge, and wherein vertical movement of the cylinder causes the one or more wedges to exert a lifting and locking force on the pallet sufficient to lift the pallet off of the conveyor and lock the pallet into a fixed position above the conveyor and in engagement with the locating bushings and locating pads of the fixed location blocks.

* * * * *